United States Patent [19]
Sicher et al.

[11] Patent Number: 6,112,084
[45] Date of Patent: Aug. 29, 2000

[54] CELLULAR SIMULTANEOUS VOICE AND DATA INCLUDING DIGITAL SIMULTANEOUS VOICE AND DATA (DSVD) INTERWORK

[75] Inventors: Alan Sicher, Garland, Tex.; Nikos Katinakis, Kista, Sweden

[73] Assignee: Telefonaktiebolaget LM Ericsson, Stockholm, Sweden

[21] Appl. No.: 09/047,240

[22] Filed: Mar. 24, 1998

[51] Int. Cl.[7] .............................. H04Q 7/20; H04B 7/212
[52] U.S. Cl. ......................... 455/426; 455/557; 370/347; 375/220; 375/222
[58] Field of Search .................................... 455/426, 557; 375/220, 222, 241, 242, 259; 370/498, 328, 335, 337, 395

[56] References Cited

U.S. PATENT DOCUMENTS

| | | | |
|---|---|---|---|
| 4,837,800 | 6/1989 | Freeburg et al. | 455/557 |
| 5,239,557 | 8/1993 | Dent | 375/1 |
| 5,422,816 | 6/1995 | Sprague et al. | 364/449 |
| 5,450,472 | 9/1995 | Brax | 379/58 |
| 5,453,986 | 9/1995 | Davis et al. | 370/62 |
| 5,479,480 | 12/1995 | Scott | 379/59 |
| 5,483,531 | 1/1996 | Jouin et al. | 370/79 |
| 5,487,175 | 1/1996 | Bayley et al. | 455/54.2 |
| 5,488,649 | 1/1996 | Schellinger | 455/411 |
| 5,497,373 | 3/1996 | Hulen et al. | 370/79 |
| 5,553,063 | 9/1996 | Dickson | 370/29 |
| 5,553,079 | 9/1996 | Niki et al. | 370/110.4 |
| 5,559,792 | 9/1996 | Bottoms et al. | 370/276 |

(List continued on next page.)

FOREIGN PATENT DOCUMENTS

| | | |
|---|---|---|
| 0 801 513 A1 | 10/1997 | European Pat. Off. . |
| 0 844 796 A2 | 5/1998 | European Pat. Off. . |
| WO 95/26603 | 10/1995 | WIPO . |
| WO 97/19569 | 5/1997 | WIPO . |

OTHER PUBLICATIONS

Chuck Brown and Kamilo Feher; "A Reconfigurable Modem for Increased Network Capacity and Video, Voice, and Data Transmission over GSM PCS"; *IEEE Transactions on Circuits and Systems for Video Technology*; Apr., 1996, vol. 6, No. 2, pp. 215–224.

"Boca Research forges ahead with Digital Simultaneous Voice and Data Products"; *Mobile and Wireless Analysis a Global Perspective;* Sep. 12, 1995.

"U.S. Robotics Announces DSVD Modem; Digital Simultaneous Voice and Data Over a Single Telephone Line Intel's ProShare Premier Software Bundled with Modem"; *Mobile and Wireless Analysis a Global Perspective;* Apr. 24, 1995.

Wireless and Cellular Modems: Overview; *Mobile and Wireless Analysis a Global Perspective*; Aug., 1994, pp. 1–6.

*Primary Examiner*—Dwayne D. Bost
*Assistant Examiner*—Erika A. Gary
*Attorney, Agent, or Firm*—Smith & Danamraj, P.C.

[57] ABSTRACT

A system and method of simultaneously conducting a data transfer and a voice call between a mobile station and a radio telecommunications network having a mobile switching center (MSC) which serves the mobile station. A first embodiment includes a landline digital simultaneous voice and data (DSVD) modem associated with the mobile station which generates DSVD source signal and line negotiation protocols. The DSVD source signal and line negotiation protocols are encapsulated into circuit mode Radio Link Protocol (RLP) signals and transmitted to the MSC. An interworking function (IWF) associated with the MSC translates the circuit mode RLP signals into signals in a landline telecommunications protocol. In another embodiment, the voice call is carried over the air interface from the mobile station to the network in one timeslot, and the data transfer is carried in at least one additional timeslot on the same voice channel. In other embodiments, two voice channels may be allocated to the same mobile station. The voice call to a first party is carried from the mobile station to the network on one voice channel, and the data transfer to the first or a second party is carried on the second voice channel. The MSC hands off the two voice channels together, but releases them individually when either the voice call or the data transfer is completed.

26 Claims, 8 Drawing Sheets

U.S. PATENT DOCUMENTS

| | | | |
|---|---|---|---|
| 5,570,389 | 10/1996 | Rossi | 375/220 |
| 5,590,406 | 12/1996 | Bayley et al. | 455/54.2 |
| 5,711,012 | 1/1998 | Bottoms et al. | 455/557 |
| 5,726,764 | 3/1998 | Averbuch et al. | 358/403 |
| 5,757,792 | 5/1998 | Aoki | 370/347 |
| 5,781,612 | 7/1998 | Choi et al. | 455/435 |
| 5,809,066 | 9/1998 | Suomi et al. | 375/222 |
| 5,845,210 | 12/1998 | Moon | 455/426 |
| 5,896,375 | 4/1999 | Dent et al. | 370/347 |
| 5,903,851 | 5/1999 | Backstrom et al. | 455/557 |

CELLULAR SIMULTANEOUS VOICE AND DATA INCLUDING DIGITAL SIMULTANEOUS VOICE AND DATA (DSVD) INTERWORK

BACKGROUND OF THE INVENTION

1. Technical Field of the Invention

This invention relates to radio telecommunication systems and, more particularly, to a system and method of simultaneously transmitting voice and data in a digital radio telecommunications network.

2. Description of Related Art

There are several methods for providing simultaneous voice and data in the prior art, but the methods address the problem strictly from a landline perspective. Additionally, some landline methods are based on the Integrated Services Digital Network (ISDN) which utilizes entirely different channels for voice and data. ISDN is not really applicable to mobile telephony. In addition, ISDN solutions have the disadvantages of high access and equipment prices, and the lack of an ubiquitous ISDN service offering.

Digital landline modems capable of simultaneously transmitting voice and data are known as Digital Simultaneous Voice and Data (DSVD) modems. There is also an analog version called Analog Simultaneous Voice and Data (ASVD). When incompatible competing products began to appear on the market, a standards group called TR.30 began to develop a set of standards for digital landline modems.

A DSVD modem works on one channel and multiplexes the voice and data traffic. The DSVD modem takes a voice signal and digitizes and compresses it (i.e., encodes it) in an 8-kilobit bandwidth with a speech encoding algorithm in a digital codec. As required, data traffic utilizes the remainder of the available bandwidth on the channel. The TR.30 standards also provide for Voice Activity Detection (VAD) which continuously determines whether there is any voice activity on the channel. If there is no voice activity, then most of the modem bandwidth is reallocated to the sending of data during the gap in voice activity. When voice activity resumes, some of the bandwidth is reallocated to the transmission of voice. For example, if a system is operating with a 28.8 kilobits per second (kbps) (V.34) modem, voice traffic may utilize 8 kbps while data utilizes 14.4 kbps. When the user stops talking, the rate for data jumps to 28.8 kbps. When the users starts talking again, the data rate falls back to 14.4 kbps. DSVD modems may be utilized for such applications as collaborative conferencing (e.g., shared whiteboard or image/document sharing), remote presentations, remote terminal viewing, games, entertainment, home shopping, and simultaneous faxing.

However, because of the optimized speech compression utilized in digital cellular networks, a modulated DSVD signal cannot be directly passed through the digital cellular codec without significant impairment. Therefore, other solutions are required. DSVD and ASVD modems exist for landline communication systems only. Mobile subscribers do not have the ability to simultaneously transmit voice and data through a DSVD modem. From the perspective of mobile communications, systems utilizing Code Division Multiple Access (CDMA) may have a simultaneous voice and data service that supports the sending of packet data along with voice, but the CDMA specifications do not address the inoperability with DSVD. CDMA does not teach or suggest a method of transmitting simultaneous TR.30 circuit mode data and voice. The Global System for Mobile Communications (GSM) system does not provide simultaneous voice and data service on a single channel, but allows a user to switch between a voice mode and a data or fax mode without hanging up. Thus, if two subscribers are talking, they can do a service switch, or service change to another mode such as a data or fax mode, send a fax, and then revert back to conversation mode.

Although there are no known prior art teachings of a solution to the aforementioned deficiency and shortcoming such as that disclosed herein, U.S. Pat. No. 5,553,063 to Dickson (Dickson) and an IEEE article by Brown and Feher, "A Reconfigurable Modem for Increased Network Capacity and Video, Voice, and Data Transmission over GSM PCS" (Brown et al.) discuss subject matter that bears some relation to matters discussed herein. Dickson discloses a system for full duplex real time two-way voice and data communication between a pair of computer terminals. However, the system of Dickson is strictly a landline system, and there is no teaching or suggestion of a system which simultaneously transmits voice and data in a digital radio telecommunications network either by utilizing existing IS-136 standards and network nodes, or by interworking DSVD modems within the nodes of the network.

Brown et al. disclose a reconfigurable modem interface compatible with the GSM system which doubles the number of simultaneous video and voice transmissions per channel. However, Brown et al. describe a complex implementation utilizing half-rate voice coding based on a modified vector sum excited linear prediction (VSELP) algorithm, and utilizing variable rate codecs. Brown et al. do not teach or suggest a system which simultaneously transmits voice and data in a digital radio telecommunications network either by utilizing existing IS-136 standards and network nodes, or by interworking DSVD modems within the nodes of the network, thereby providing a simple implementation suitable for simultaneous voice and moderate data requirements.

Review of each of the foregoing references reveals no disclosure or suggestion of a system or method such as that described and claimed herein.

In order to overcome the disadvantage of existing solutions, it would be advantageous to have a system which interworks DSVD modems with a cellular radio system in a simple implementation suitable for simultaneous voice and moderate data requirements. The present invention provides such a system. The present invention also simultaneously transmits voice and data in a digital radio telecommunications network by utilizing existing IS-136 standards and network nodes. Additionally, ASVD modems may be utilized for analog transmissions.

SUMMARY OF THE INVENTION

The present invention is a system and method for efficiently supporting the use of DSVD modems with a digital cellular radio telecommunications network. The method enables a mobile subscriber to perform such functions as, for example, talking while he is also transmitting whiteboard application information. One such application allows a mobile subscriber to utilize a display screen and receive pen cursor drawings while talking to the calling party at the same time. The data bandwidth for this type of application can be handled by off-the-shelf DSVD modems. The present invention supports these types of applications in cellular networks utilizing standard off-the-shelf DSVD modems.

Thus, in one aspect, the present invention is a system for interworking digital simultaneous voice and data (DSVD) modems with a radio telecommunications network having a mobile switching center (MSC) which communicates with a mobile station utilizing a circuit mode Radio Link Protocol (RLP). The system includes a DSVD modem associated with the mobile station which generates DSVD source signal and line negotiation protocols. The system also includes means for encapsulating the base band DSVD source signal and line negotiation protocols into the circuit mode RLP signals, and an interworking function associated with the MSC for translating the circuit mode RLP signals into signals in a landline telecommunications protocol. Finally, the system includes means for modulating and transmitting the signals in a landline telecommunications protocol to a landline telecommunications network.

In another aspect, the present invention is a system for interworking DSVD modems with a radio telecommunications network having a MSC which communicates with a mobile station utilizing circuit mode RLP signals, the system comprising a coder/decoder (codec) associated with the mobile station for coding a voice signal according to voice coding standards for DSVD modems, and means within the mobile station for passing a data signal between the MSC and an applications terminal connected to the mobile station. The system also includes an interworking function associated with the MSC for multiplexing the voice signal and the data signal and translating the multiplexed signal from circuit mode RLP signals into signals in a landline telecommunications protocol. Finally, the system includes means for modulating and transmitting the signals utilizing a landline telecommunications protocol to a landline telecommunications network.

In another aspect, the present invention is a method of initiating and conducting a data transfer from a mobile station simultaneously with an ongoing voice call from the mobile station to a radio telecommunications network having a mobile switching center (MSC) which serves the mobile station. The method begins by establishing the voice call between the mobile station and a called party telephone number, connecting the mobile station to a data terminal through a regular modem, and notifying the MSC using a flash message from the mobile station that a data transfer is desired. This is followed by providing the MSC with a destination telephone number for the data transfer, assigning within the MSC a first timeslot for the voice call and at least one additional timeslot for the data transfer, and delivering the data transfer to the destination telephone number while continuing the voice call.

In yet another aspect, the present invention is a method of simultaneously conducting a data transfer and a voice call between a mobile station having first and second transmitter/receiver pairs, and a radio telecommunications network having a mobile switching center (MSC) which serves the mobile station. The method begins by notifying the MSC that a simultaneous voice and data call with the mobile station is desired, allocating a first voice channel to the first transmitter/receiver pair in the mobile station, and allocating a second voice channel to the second transmitter/receiver pair in the mobile station. This is followed by establishing the voice call on the first voice channel, and establishing the data transfer on the second voice channel.

In yet another aspect, the present invention is a method of simultaneously conducting a data transfer and a voice call between a mobile station having a first transmitter/receiver pair, and a radio telecommunications network having a mobile switching center (MSC) which serves the mobile station. The method begins by connecting the mobile station to a data terminal through a modem having a second transmitter/receiver pair, notifying the MSC that a simultaneous voice and data call with the mobile station is desired, allocating a first voice channel to the first transmitter/receiver pair in the mobile station, and allocating a second voice channel to the second transmitter/receiver pair in the modem. This is followed by establishing the voice call on the first voice channel, and establishing the data transfer on the second voice channel.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention simultaneously transmits voice and data in a digital radio telecommunications network. Several embodiments are disclosed herein, including: (1) DSVD interwork utilizing two distinct mobile channels; (2) DSVD interwork utilizing a single mobile channel; and (3) simultaneous voice and data utilizing two distinct and independent mobile channels or mobile channel frequencies without DSVD interwok.

Figure 1:
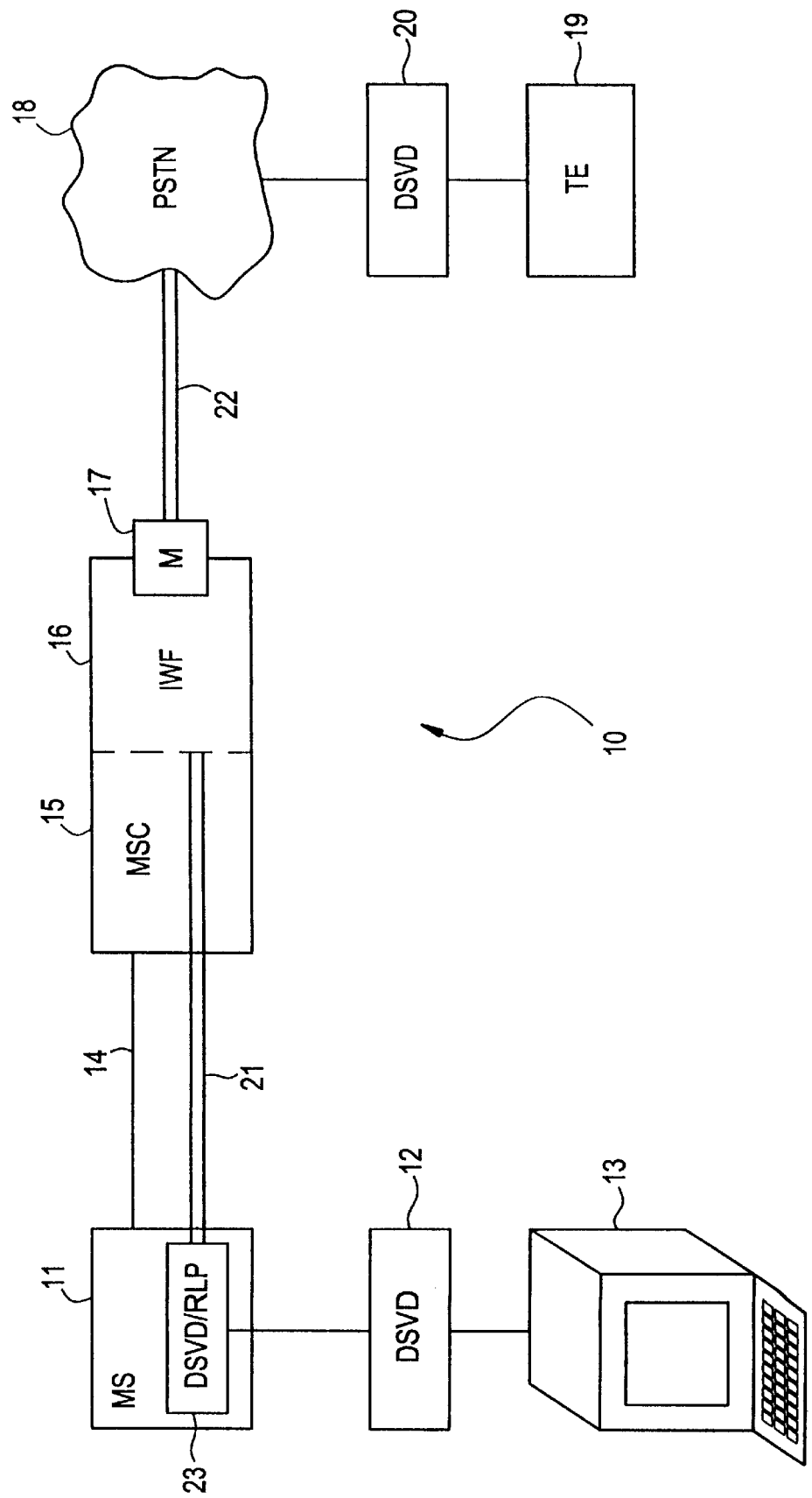
FIG. 1 is a block diagram illustrating the components of a radio telecommunications network which has been modified to incorporate a first embodiment of the present invention.

FIG. 1 is a block diagram illustrating the components of a radio telecommunications network 10 which has been modified to incorporate a first embodiment of the present invention. The first embodiment utilizes TR.30 DSVD interworking to provide simultaneous voice and data on a single digital traffic channel in the radio telecommunications network 10. A mobile station (MS) 11 is connected through part of a DSVD modem 12 to a terminal such as a computer terminal 13 for a mobile subscriber's use when utilizing simultaneous voice and data features. Alternatively, the functions of the MS, modem, and computer terminal may be combined in a single device. The MS 11 is connected via a standard air interface link 14 to a Mobile Switching Center (MSC) 15. A base station linking the MS 11 and the MSC 15 has been omitted for simplicity. The air interface link 14 may be a standard Time Division Multiple Access (TDMA) radio link according to the IS-136 standard which is hereby incorporated by reference herein. However, the present invention is also applicable to other mobile telecommunications technologies such as the Global System for Mobile Communications (GSM), the Pacific Digital Cellular (PDC) System, etc.

The MSC 15 may directly or indirectly connect to an Interworking Function (IWF) 16. The IWF 16 is logically connected to the call to provide interworking between the mobile-specific protocols utilized on the air interface and landline specific protocols utilized with data transmissions. For example, the IS-136 air interface standard defines how data transmitted to and from a mobile station is formatted into TDMA slots/frames. When a data call is received at the MSC 15, the data is transparently switched/routed to the IWF 16 where it is placed in the TDMA format for transmission to the mobile station 11. Functions performed in the IWF include rate adaptation between the transmission rate over the air interface and the transmission rate over the land lines. Thus, the IWF performs flow control, error control, data buffering, encryption, compression, etc.

The IWF 16 is connected via a DSVD modem device 17 to landline networks such as the Public Switched Telephone Network (PSTN) 18. Other terminal equipment (TE) 19 may be connected to the PSTN through DSVD modems 20.

In the first embodiment, referred to as the transparent case, a high speed bit pipe 21 is provided all the way from the mobile station 11 to the IWF 16. The DSVD source signal and line negotiation protocols are encapsulated directly without modification into the circuit mode Radio Link Protocol (RLP) frame stream as specified by, for example, IS-130. With a simultaneous voice and data application running on the terminal 13, a DSVD signal from the application is routed through the high speed bit pipe 21 to the IWF 16. The signal is a base band signal (i.e., it has not yet gone through an analog voiceband modulator). Therefore, the DSVD modem 12 is similar to the DSVD modem 20 except that the signal does not pass through an analog modulator that creates, for example, a quadrature amplitude modulation (QAM) wave pattern. Instead, the DSVD base band bit stream is taken from the application, foamed, and multiplexed directly into TDMA slots in the DSVD/RLP function 23. The DSVD bit stream is then transmitted to the MSC 15 where it goes directly to the IWF 16. The IWF 16 takes the DSVD bit stream that is received and runs it through the modem device 17 where it is modulated, and a voice band signal 22 is generated. Thus, this embodiment is referred to as the transparent case, because from a system perspective, the interworking is confined in the IWF 16, and the original base band signal is not affected. The bit pipe 21 merely provides a conduit from the mobile station 11 to the IWF 16, and the bit stream is then modulated in the modem device 17. The advantages of the transparent case is that it minimizes the complexity of the MSC and the IWF 16. The IWF simply receives a base band signal that is in the correct format and then routes the signal through a modulator in the modem 17. In the TDMA context, a multi-slot channel resource may be required to provide sufficient air-interface bandwidth.

Figure 2:
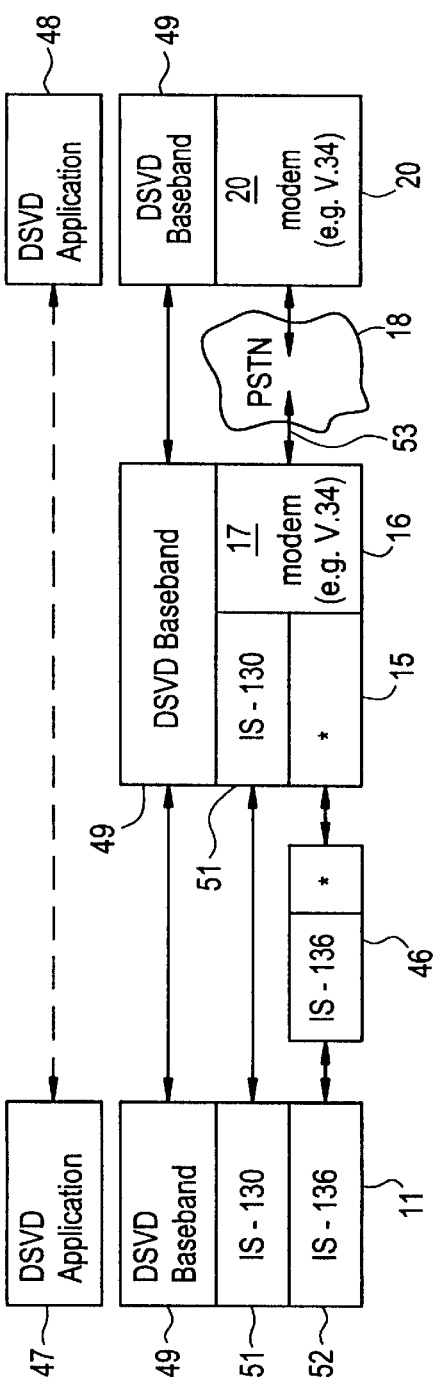
FIG. 2 is a communications profile illustrating the communications protocols utilized, and the protocol translations performed while making the connection of FIG. 1 utilizing parts of a DSVD modem.

FIG. 2 is a communications profile illustrating the communications protocols utilized, and the protocol translations performed while making the connection of FIG. 1 utilizing parts of a DSVD modem. Communications are shown between the MS 11, a base station 46, the MSC 15, the IWF 16, the PSTN 18, and a DSVD modem 20 which may connect other terminal equipment to the PSTN. A DSVD application 47 in the MS 11 ultimately communicates at the application layer with a DSVD application 48 that is running on a DSVD-connected terminal. At lower layers, there is a DSVD baseband layer 49 which is utilized in the Ms 11, the MSC 15, the IWF 16, and the DSVD modem 20. Below that, an IS-130 layer 51 operates between the MS 11 and the MSC/IWF functional conglomerate. An IS-136 layer 52 operates between the MS 11 and the base station 46. The base station 46 communicates with the MSC 15 utilizing transmission protocols that may be proprietary to the equipment manufacturer. Within the IWF 16, the modem device 17 modulates the DSVD bit stream, and generates a voice band signal 53 which is sent to the PSTN 18.

Figure 3:
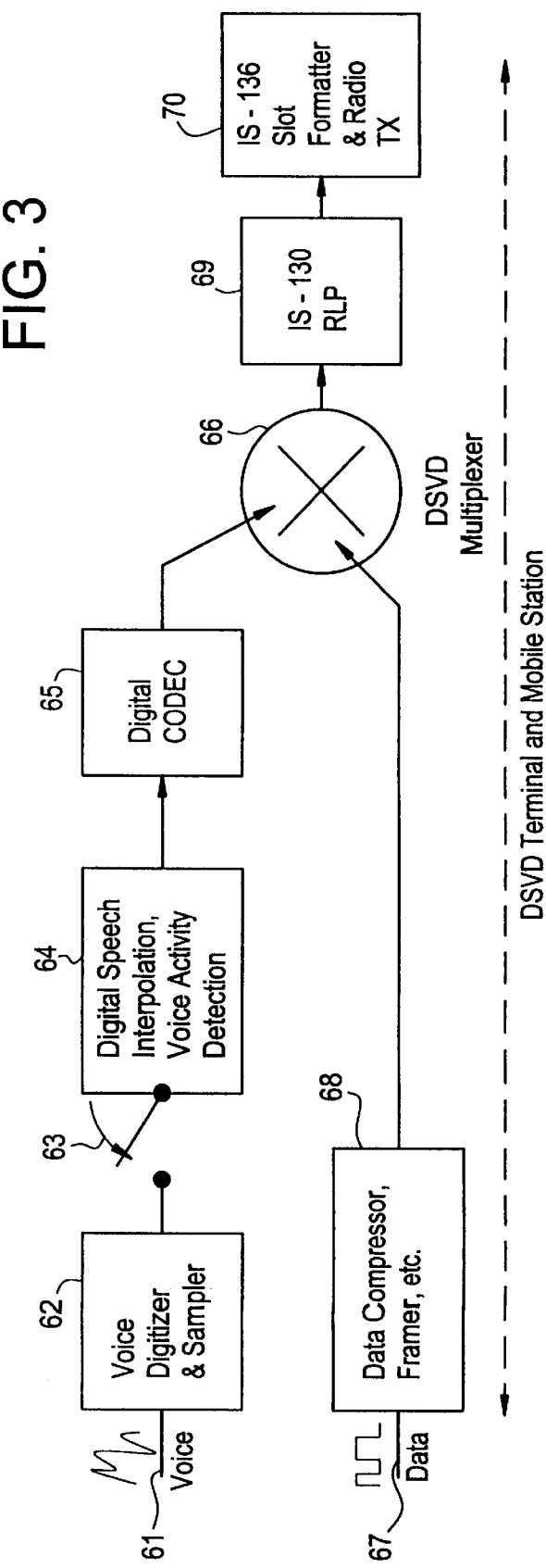
FIG. 3 is a process diagram illustrating the steps of the method of the present invention when utilizing a DSVD multiplexer to provide simultaneous voice and data on a digital traffic channel.

FIG. 3 is a process diagram illustrating the steps performed by the DSVD/RLP function 23 of FIG. 1. A voice signal 61 is digitized and sampled in a voice digitizer and sampler 62. The voice signal then passes through a switch 63 to a digital speech interpolation and voice activity detection function 64. From there, the signal enters a digital codec 65. The output of the codec is applied to a DSVD multiplexer 66. Simultaneously, a data signal 67 enters a data compressor and framer function 68. The output of the data compressor and framer function is applied to the DSVD multiplexer 66. The output of the multiplexer is a multiplexed DSVD bit stream which is encapsulated at 69 into the circuit mode RLP frame stream as specified by, for example, IS-130. The RLP frame stream is then formatted into TDMA slots and transmitted in the IS-136 slot formatter and radio transmitter 70.

Figure 4:
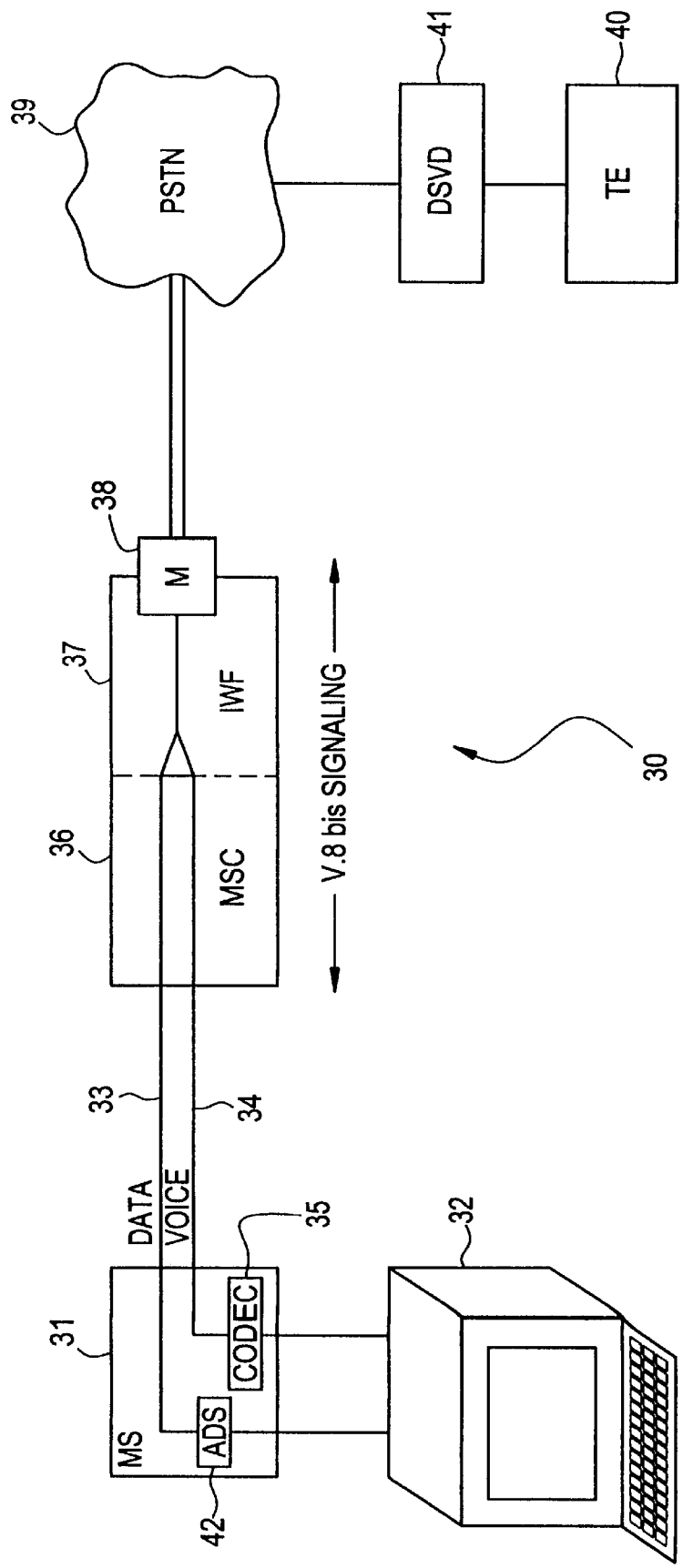
FIG. 4 is a block diagram illustrating the components of a radio telecommunications network which has been modified to incorporate a second embodiment of the present invention.

There are two major types of TDMA-RLPs, a "transparent" RLP and a "non-transparent" RLP. The transparent RLP utilizes a fixed data rate and a variable error rate. The non-transparent RLP utilizes a variable data rate and a fixed error rate. Because of concerns regarding latencies that arise when transporting voice information on a non-transparent service, the configuration shown in FIG. 4 is preferably supported over a transparent RLP connection. The currently defined transparent RLP for TDMA is known as RLP2.

FIG. 4 is a block diagram illustrating the components of a radio telecommunications network 30 which has been modified to incorporate a second embodiment of the present invention. A mobile station (MS) 31 is connected to a terminal such as computer terminal 32. A data bit stream 33 and a voice bit stream 34 are carried separately between the mobile station 31 and the terminal 32. The mobile station includes a coder/decoder (codec) 35 for coding and decoding the voice bit stream 34. The mobile station 31 is connected via a standard IDMA air interface link to a MSC 36. A base station linking the mobile station 31 and the MSC 36 has been omitted for simplicity. The MSC 36 includes an IWF 37 which performs flow control, error control, data buffering, encryption, compression, and multiplexing of the data bit stream 33 and the voice bit stream 34. The IWF 37 is connected via a modem device 38 to landline networks such as the PSTN 39. Other terminal equipment (TE) 40 may be connected to the PSTN through DSVD modems 41.

Thus, the second embodiment essentially provides two circuit channels, a data channel and a voice channel. The voice channel uses the digital codec 35 in the mobile station 31 (for example, VSELP, ACELP:IS-164, etc.), and the data channel uses the mobile station's existing data capabilities, such as Asynchronous Data Service (ADS) 42 based on IS-130. The voice and the data are two logically separate channels although they may be transmitted on the same frequency. The TDMA structure may have, for example, two timeslots for voice and four timeslots for data on the same radio frequency. Thus, the voice and the data are handled essentially as independent channels. When these two channels come into the MSC 36, the compressed voice stream may be translated into 64 kbps PCM like other voice-only calls, or it may be transparently routed to the IWF 37 for decoding. This translation may not be necessary if the codec 35 is based on ITU standard G.704, and the output is very similar to the output of the codec utilized in DSVD modems. In that case, the compressed frames are manipulated into the required format without going through a separate decoding and encoding process in the IWF 37. Then the translated voice and data base band signals are multiplexed together as prescribed by the TR.30 DSVD standards, and are interleaved and transported in frames which may be multiplexed utilizing a time-division multiplexing technique. The multiplexed stream is then modulated through the modem device 38 which is connected to landline networks such as the PSTN 39.

In an alternative embodiment, two different codecs are utilized in the IWF 37, and an intermediate Pulse Code Modulation (PCM) or Adaptive PCM (ADPCM) conversion may be required between the radio voice codec (e.g., VSELP, ACELP) and DSVD. The intermediate PCM conversion performs successive radio-voice-codec-to-PCM and PCM-to-DSVD conversions within the IWF 37.

Each TDMA frame comprises six timeslots, and each full-rate voice user occupies two of those timeslots. The present invention avoids a multi-frequency mobile implementation supporting two frequencies by utilizing from one to four of the available timeslots in the TDMA frame for data. The bandwidth available to the user therefore ranges anywhere from 4.8 to 19.2 kbps. In the embodiment shown in FIG. 4, the bandwidth allocated to voice is static. A variable rate codec could be utilized, however, that may require a change in the existing TDMA structure.

While this embodiment lacks some of the simplicity of the embodiment shown in FIG. 1, it provides for greater robustness, simplified rationalized mobile terminals, and greater air-interface flexibility. The mobile station 31 can reuse the codec 35 which is already in the mobile station, and the TDMA structure can treat the voice connection and the data connection as independent connections for the most part. However, coordination at the cellular system level is required since, for example, both connections should hand off at the same time and maintain the same physical layer settings. Examples of the coordination and the required triggers toward the cellular system in order to recognize the operation and successfully introduce the IWF are given in the embodiments of the present invention that follow.

A number of industry standards have been developed by the TR.30.1 working group (PN 3359), and are applicable to the present invention. These are V.8 bis, V.34 or V.34Q, V.70, V.75, V.76, V.61, G.729, and IS-136 rev B. The V.8 bis standard is essentially a signaling standard which specifies line negotiation and enables the dynamic reallocation of bandwidth to data when there is no voice activity. The V.34 and V.34Q standards cover modulation. There are some control procedures in V.75, and V.76 includes standards for the multiplexer. The V.61 standard covers analog simultaneous voice and data, and G.729 covers voice coding. Each of these standards is hereby incorporated by reference herein.

Figure 5:
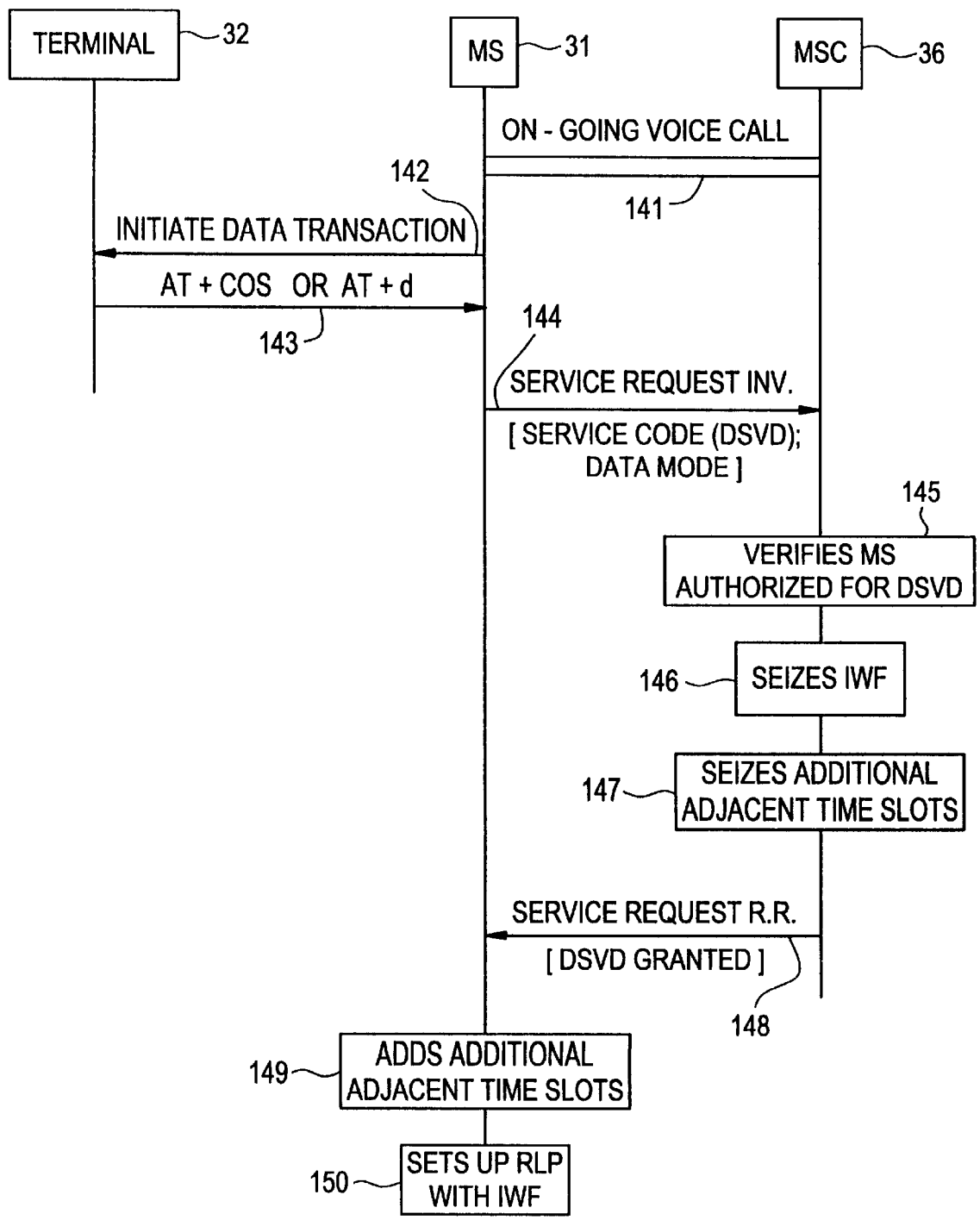
FIG. 5 is a flow chart of the steps of the method of the present invention when initiating a data transfer utilizing a Service Request message during an on-going voice call in the network configuration of FIG. 4.

FIG. 5 is a flow chart of the steps of the method of the present invention when initiating a data transfer utilizing a Service Request message during an on-going voice call 141 in the network configuration of FIG. 4. At 142, the user of the MS 31 and data terminal 32 indicates that he desires to modify the call to a DSVD call (i.e., initiate a simultaneous data transmission while continuing the voice call). At 143, the user's data application in the data terminal 32 sends a new or modified AT command (for example AT+cos or AT+d) to the MS 31. This command may also be a terminal/MS internal operation. The MS then sends a Service Request Invoke message 144 to the MSC 36 and includes a new service code value designating DSVD service and a Data-Mode parameter. The Service Request message may be sent, for example, on the fast or slow associated control channel (FACCH/SACCH).

Upon receipt of the Service Request message 144, the MSC 36 verifies at 145 that the MS 31 is authorized for DSVD service. This may be accomplished by accessing a temporary subscriber record in the MSC or by accessing the subscriber profile for the MS 31 in an associated home location register (HLR). At 146, the MSC seizes the IWF 37, and at 147 the MSC seizes additional adjacent timeslots on the same radio channel as the on-going voice call, if available. At 148, if the IWF and additional timeslots are successfully seized, the MSC sends a Service Request Return Result message to the MS 31 and includes an indication that DSVD service is granted. At 149, the MS adds the adjacent timeslots, and at 150 sets up the RLP with the connected IWF.

Figure 6:
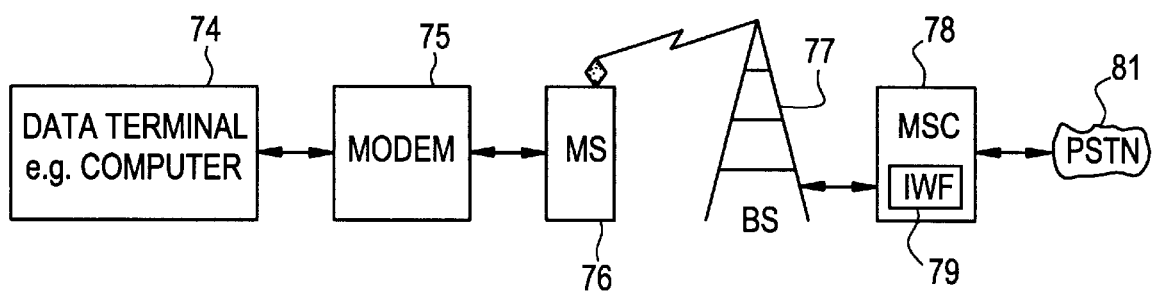
FIG. 6 is a block diagram illustrating the components of a radio telecommunications network in an embodiment in which a simultaneous voice and data connection is made between a mobile station and the PSTN without utilizing a DSVD modem.

FIG. 6 is a block diagram illustrating the components of a radio telecommunications network in an embodiment in which a simultaneous voice and data connection is made between a mobile station and the PSTN without utilizing a DSVD modem. This particular embodiment allows the simultaneous voice and data transmission to two distinct destinations or to a single destination. For example, the voice part can go to a voice receiver such as a telephone, and the data part can go to another device such as a fax or computer terminal, etc. Alternatively, both voice and data may go to a DSVD modem. For analog cellular systems, simultaneous voice and data transmission is achieved, not by using DSVD modems, but by methods that the network components can recognize and use in order to perform the service. A data terminal 74 such as a computer, is connected through a modem 75 to a mobile station (MS) 76. The mobile station communicates over an air interface to a base station 77 which is connected via landline, microwave links, or other suitable communication links to a MSC 78. The MSC may be connected to a modem bank (not shown) for carrying the data part of the call. Alternatively, the MSC may include a standard Interworking Function (IWF) 79 as is known in the art. Functions performed in the IWF include rate adaptation between the transmission rate over the air interface and the transmission rate over the land lines. Thus, the IWF performs flow control, error control, data buffering, encryption, compression, DSVD processing (as in FIG. 10), etc. The MSC communicates with the PSTN 81.

The following scenario assumes that a subscriber is involved in a telephone voice conversation. During the conversation, the need to transfer a document arises. In this embodiment, the following steps then take place:

a) The user connects the MS 76 to the regular cellular modem 75;

b) The links between the MS 76, the modem 75, and the data terminal 74 are established;

c) The subscriber initiates a "Simultaneous Voice/Data Call". This may be performed by, for example, pressing a key combination on the MS (for example, *35), indicating that a data transfer is about to take place, and pressing the "flash" key. This results in the MS initiating the Simultaneous Voice/Data Call. The actual key combination that is pressed on the mobile may be a single predefined key stroke, a menu choice, a *XX key combination, etc.

The subscriber action indicates to the MSC the need to introduce the IWF in the call path so that proper coordination occurs.

Figure 7:
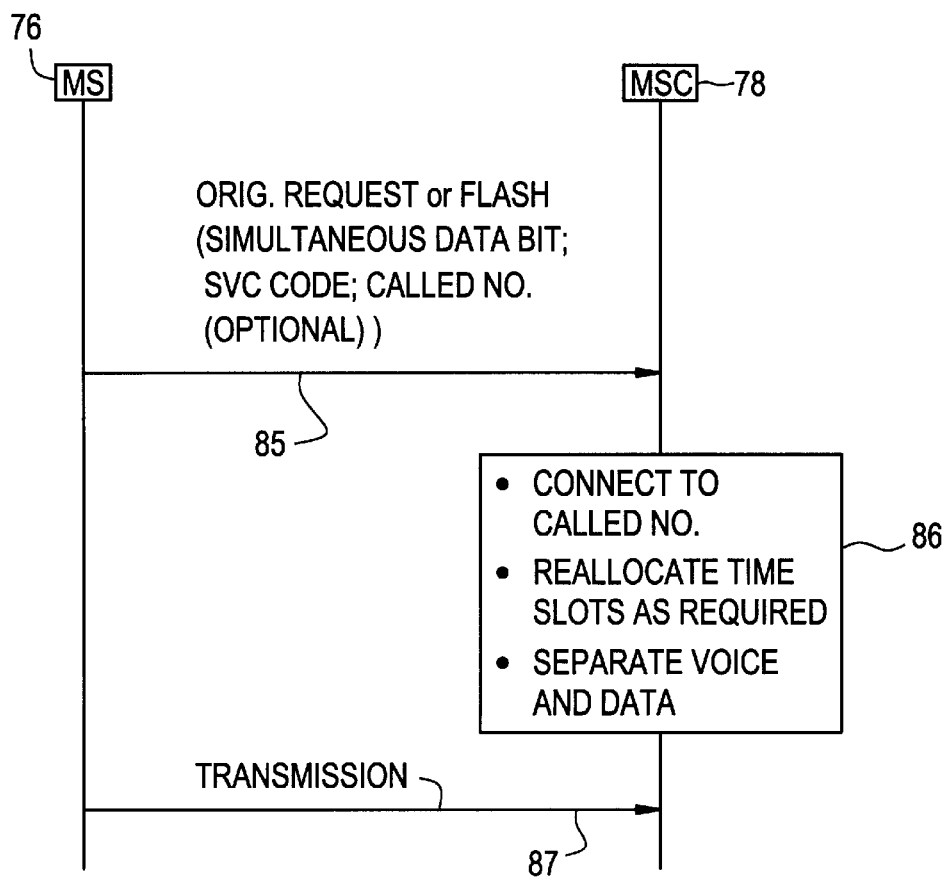
FIG. 7 is a message flow diagram illustrating the flow of messages, and actions taken, when originating a simultaneous voice and data call according to the teachings of the present invention.

FIG. 7 is a message flow diagram illustrating the flow of messages, and actions taken, when originating a simultaneous voice and data call according to the teachings of the present invention. Referring to FIGS. 6 and 7, the MS 76 sends an Origination Request (ORREQ) or Flash message 85 to the MSC 78. If the subscriber is not already involved in a voice call, and desires to originate a simultaneous voice/data call, then an ORREQ message is sent. If, however, the subscriber is already involved in a voice call, a Flash message is sent. The ORREQ or Flash message may include a called number, and may be marked in a similar manner that the "emergency bit" is set for an emergency 9-1-1 call (i.e., one bit is allocated in the message to indicate simultaneous voice/data). The call is marked with the simultaneous data bit so that the MSC does not initiate a three party call where each call is treated independently, and where one side is on hold when the other side is active (i.e., an enquiry call). If a voice call is already in progress, the called number may be the number for an independent data device. If no call is in progress, and a simultaneous voice and data call is originated, separate called numbers may be entered for the receiving data device and the receiving voice device.

In both the flash and the origination case, additional values for the marker may be utilized to indicate such parameters as the type of data call that is to be initiated, whether variable speech is utilized, the number of timeslots to occupy, etc.

Upon receiving the ORREQ or Flash message, the MSC 78 takes the steps at 86 to locate and connect to the called number, to reallocate timeslots as required to support the requested service, and utilizes its existing IWF 79 to separate the voice and data calls. Methods of performing multi-slot transmissions are known in the art, and need not be discussed further herein. At 87, the MS begins transmission of the simultaneous voice and data call.

Thus, there is no need for a DSVD modem when the receiving data device is on an independent line from the receiving voice device. In other words, the cellular subscriber takes advantage of the simultaneous transfer where the voice part of the call is directed to a normal PSTN voice phone, and the data part of the call is directed to a computer modem, fax machine, or e-mail server, etc. Methods of assigning a plurality of timeslots or voice channels to a single subscriber/connection are known in the art, and need not be discussed further herein.

In an alternative embodiment, the MS may originate a simultaneous data call to the same called number with which a voice call is already in progress. This process follows the same flow as shown in FIG. 7, except that upon receiving the feature code (e.g., *45), the MSC is programmed to set up a simultaneous data call to the number originally called for the voice call, utilizing the setup steps described above.

The above describes the origination of a simultaneous voice and data call. Obviously, two simultaneous voice calls or two simultaneous data calls may also be placed by the method described above.

Figure 8:
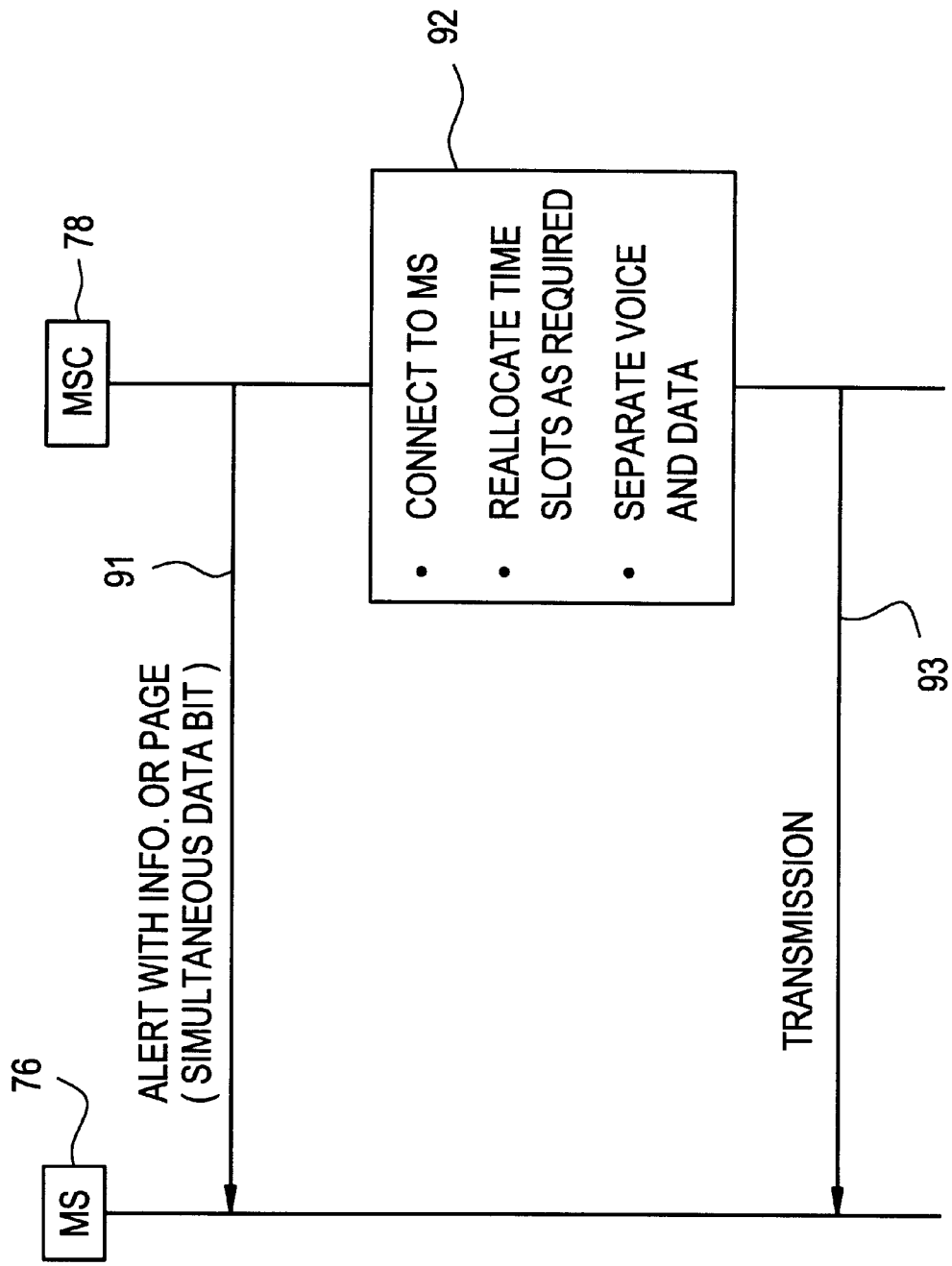
FIG. 8 is a message flow diagram illustrating the flow of messages, and actions taken, when a terminating simultaneous voice and data call is directed toward a mobile station according to the teachings of the present invention.

FIG. 8 is a message flow diagram illustrating the flow of messages, and actions taken, when a terminating simultaneous voice and data call is directed toward a mobile station according to the teachings of the present invention. Referring to FIGS. 6 and 8, the MSC 78 sends a message 91 to the MS 76 and includes the simultaneous data bit indicating that a simultaneous voice and data call is being directed to the MS. The message 91 may be, for example, an Alert-with-Info message or a page. At 92, the MSC 78 takes the steps to connect the incoming call to the MS, to reallocate timeslots as required to support the requested service, and utilizes its existing IWF 79 to separate the voice and data calls. The MSC then begins transmission of the voice and data calls to the MS at 93 by assigning a plurality of timeslots or voice channels to the MS and utilizing multi-slot transmissions.

Figure 9:
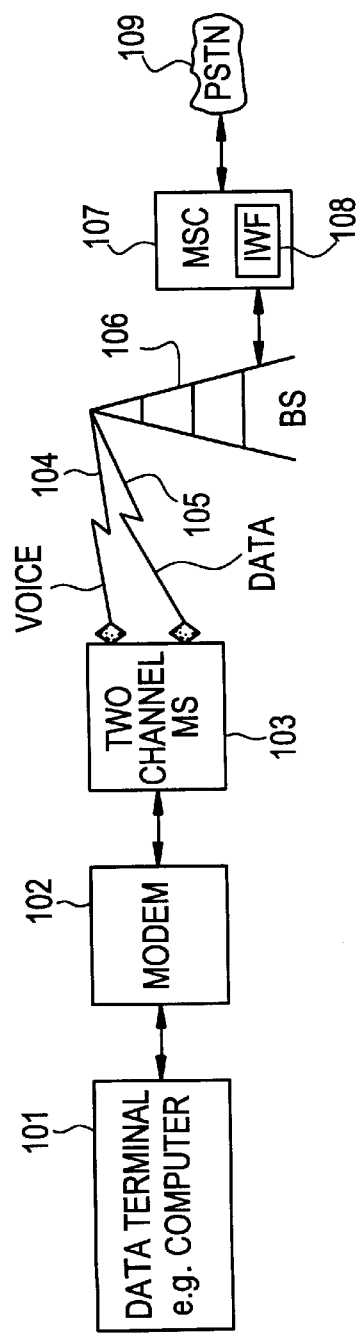
FIG. 9 is a block diagram illustrating the components of a radio telecommunications network in an embodiment in which a simultaneous voice and data connection is made between a mobile station and the PSTN utilizing separate voice channels for voice and for data according to the teachings of the present invention.

FIG. 9 is a block diagram illustrating the components of a radio telecommunications network in an embodiment in which a simultaneous voice and data connection is made between a mobile station and the PSTN utilizing separate voice channels for voice and for data according to the teachings of the present invention. Simultaneous voice data transmission is achieved, not by using DSVD modems, but by assigning two simultaneous voice channels to the same mobile station, and utilizing one channel for voice and the other channel for data. A data terminal 101 such as a computer, is connected through a modem 102 to a two-channel MS 103. The MS has two transmitter/receiver (tx/rx) pairs that can operate simultaneously on different frequencies. Thus, the MS may communicate over voice channel 104 and data channel 105 to a base station 106 which is connected via landline, microwave links, or other suitable communication links to a MSC 107. The MSC includes a standard IWF 108 as is known in the art, and as previously described (FIG. 6). The MSC communicates with the PSTN 109.

The user initiates a simultaneous voice-data call by pressing a * combination feature code or by dialing the same number of the originally dialed destination. Once the MSC has recognized that a simultaneous voice-data call is to be setup, the MSC allocates a second voice channel to the MS. This step may involve authentication and fraud-prevention measures such as requiring the subscriber to enter a personal identification number (PIN). The information regarding the second voice channel is sent to the MS over the control channel. The information may be sent, for example, utilizing a short message service (SMS) message or by adapting the IS-136 dedicated DTC handoff message with the appropriate hooks. Once the MS has received the information identifying the second voice channel, the MS tunes the second pair of transmitter/receivers. The data transfer then takes place over the second channel. Additional logic is introduced in the MSC to coordinate handoffs of the two voice channels together. Three-party services are allowed and treated normally since the voice channel that carries the voice can be switched and put on hold or in conference as the data transfer continues on the other channel.

Additional logic is also introduced in the MSC to treat termination cases intelligently. When a call on one of the two channels ends, the MSC releases only that channel. The subscriber is not marked idle, however, until both channels are free. This allows for the voice conversation to continue after the data transfer has been completed, and the data channel has been released. Also, the data transfer (e.g., fax) can continue after the user has confirmed that the receiving party has started receiving the fax, and the voice call has ended. Thus, network resources are not unnecessarily occupied.

Abnormal release of one of the two channels does not result in a call termination. The subscriber is given an indication on the other voice channel of the release. All other forms of termination (for example, power down) results in both channels being released and the subscriber marked idle.

Figure 10:
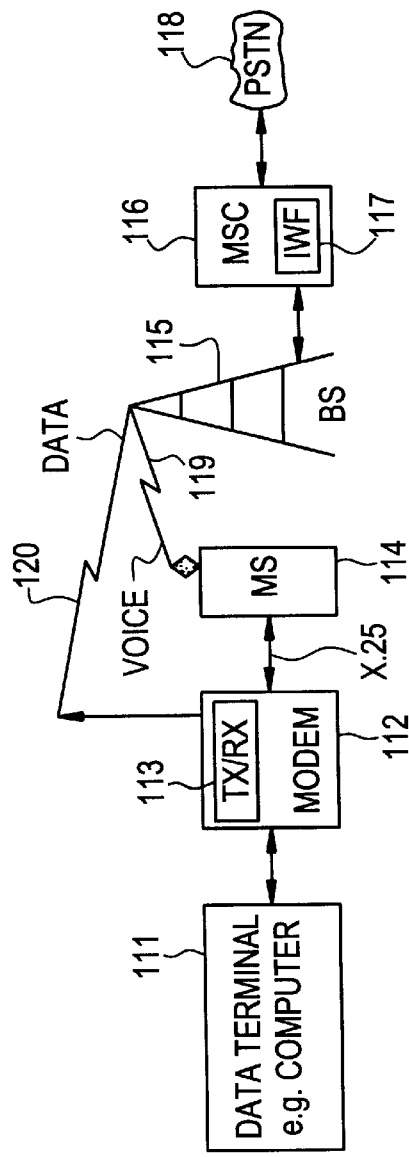
FIG. 10 is a block diagram illustrating the components of a radio telecommunications network in an embodiment in which separate voice and data connections are made between a mobile station, an associated data terminal, and the PSTN utilizing separate voice channels for voice and for data according to the teachings of the present invention.

FIG. 10 is a block diagram illustrating the components of a radio telecommunications network in an embodiment in which separate voice and data connections are made between a mobile station, an associated data terminal, and the PSTN utilizing separate voice channels for voice and for data according to the teachings of the present invention. A data terminal 111 such as a computer, is connected through a modem 112 to a MS 114. The modem includes a transmitter/receiver (tx/rx) pair that can operate on any assigned radio telecommunications frequency. In this embodiment, only a small amount of information is passed between the MS 114 and the modem 112. Thus, any asynchronous or synchronous HDLC-based data protocol such as X.25 between the two devices will suffice. The MS communicates with a base station 115 which is connected via landline, microwave links, or other suitable communication links to a MSC 116. The MSC includes a standard IWF 117 as is known in the art. The MSC communicates with the PSTN 118. Thus, the MS may communicate over voice channel 104 and data channel 105 to a base station 106 The user initiates a simultaneous voice-data call by pressing a * combination feature code or by dialing the same called number of a call which may be ongoing on voice channel 119. Once the MSC 116 has recognized that a simultaneous voiced call is to be setup, the MSC allocates a second voice channel 120 to the MS 114. Once the MS has received the information regarding the second voice channel, the MS instructs the modem 112 to tune to the second voice channel 120 utilizing the tx/rx pair 113. Once the modem has finished the setup procedure, it instructs the MS that the setup is complete. In turn, the MS instructs the MSC that setup is complete. Authentication of the second voice channel is performed once the message that setup is complete has been received by the MSC. This is required so that fraud opportunities are minimized (voice channel hi-jacking). Also, among the information that the MS is passing to the modem device is the authentication data (A-key). This is done so that MSC-initiated challenges can be responded to properly by the modem. From that point on the two devices may act independently, with the modem 112 transmitting and receiving data over the second voice channel 120. The MSC may coordinate events such as handoff to ensure that both channels are handed off together.

Thus, in this embodiment, the MS 114 acts as a coordinator with another cellular device (e.g., modem) in way that can be described as "master-slave". This removes the complexity required in the mobile from the previous embodiment.

Like the previous embodiment, additional logic is introduced in the MSC 116 to treat termination cases intelligently. When a call on one of the two channels ends, the MSC releases only that channel. The subscriber is not marked idle, however, until both channels are free. This allows for the voice conversation to continue after the data transfer has been completed, and the data channel has been released. Also, the data transfer (e.g., fax) can continue after the user has confirmed that the receiving party has started receiving the fax, and the voice call has ended. Thus, network resources are not unnecessarily occupied.

Figure 11:
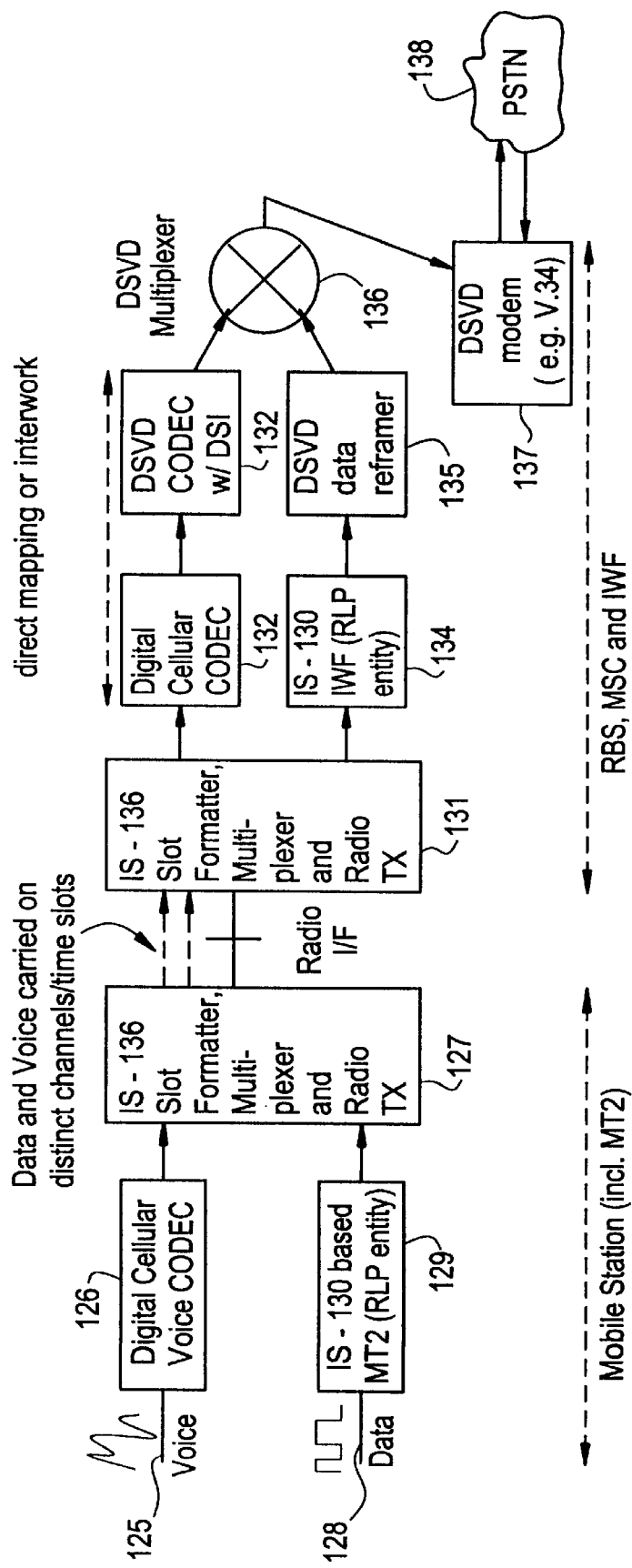
FIG. 11 is a process diagram illustrating the steps performed by the present invention in an embodiment in which a simultaneous voice and data connection is made between a mobile station and the PSTN while utilizing DSVD processes in the interworking function (IWF).

FIG. 11 is a process diagram illustrating the steps performed by the present invention in an embodiment in which a simultaneous voice and data connection is made between a mobile station and the PSTN while utilizing DSVD processes in the interworking function (IWF). A voice signal 125 enters a digital cellular voice codec 126 within the mobile station. The output of the codec enters an IS-136 slot formatter, multiplexer, and radio transmitter 127. Simultaneously, a data signal 128 enters an IS-130-based MT2 radio link protocol (RLP) function 129. The mobile station transmits the data and voice on separate, distinct channels/timeslots over the air interface to the base station 131. The base station also includes an IS-136 slot formatter, multiplexer, and radio transmitter. The base station sends the voice signal to the MSC and IWF where the signal first enters a digital cellular codec 132 and then a DSVD codec with DSI 133. Simultaneously, the base station sends the data signal to the MSC and IWF where the signal first enters an IS-130 IWF RLP function 134 and then a DSVD data reframer 135. Both the voice signal and the data signal are then input into a DSVD multiplexer 136. The output of the multiplexer is sent to a DSVD modem (for example a V.34) 137. The DSVD modem communicates with the PSTN 138.

The simultaneous voice/data call illustrated in FIG. 11 may be set up in a similar manner as the process in FIG. 6 in which a simultaneous voice/data bit is utilized to instruct the MSC to begin the process and assign two voice channels to the MS. However, the preferred approach for the embodiment illustrated in FIG. 11 is to utilize the IS-135 AT+COS command to trigger the IS-136 "Service Request" message indicating a new value for DSVD and specifying the requested channel "bandwidth" and "data part" subparameters. This is well suited to DSVD except where the second call is towards another PSTN land line subscriber.

Multimedia and conferencing standards H.120 and H.323 address this situation, and are hereby incorporated by reference herein.

Within the MS, air-interface voice frames are formatted according to an IS-136 layer which relates to the lower OSI layers (i.e., the physical layer and part of the link layer). The voice frames are formed by the mobile digital voice codec 126 utilizing techniques such as, for example, Adaptive Codebook Excitation Linear Predictive (ACELP) or other digital voice codecs. In one embodiment, the voice frames may be Alternate Full Rate (AFR) frames. The AFR codec is an ACELP codec utilized in IS-136 TDMA systems as an alternate to Vector Sum Excitation Linear Predictive (VSELP). There are several alternative methods of translating between Voice AFR and the three commonly used Voice-over-IP algorithms. The simplest method is to utilize an intermediate PCM conversion so that there are successive AFR-to-PCM and PCM-to-Voice-over-IP conversions within the IWF. Another method is to utilize voice encoding mapping directly between the Voice AFR voice encoding algorithm and the Voice-over-IP voice encoding algorithm. This works well when the two codecs are derived from the same codec family.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for interworking digital simultaneous voice and data (DSVD) modems with a radio telecommunications network having a mobile switching center (MSC) which communicates with a mobile station utilizing a circuit mode Radio Link Protocol (RLP), said system comprising:
    a DSVD modem associated with said mobile station, said DSVD modem generating DSVD source signal and line negotiation protocols;
    means for encapsulating DSVD source signal and line negotiation protocols without modification into circuit mode RLP signals, said means for encapsulating including means for multiplexing said DSVD source signal and line negotiation protocols into a single voice channel;
    an interworking function associated with said MSC for translating said circuit mode RLP signals into signals in a landline telecommunications protocol; and
    means for modulating and transmitting said signals in a landline telecommunications protocol to a landline telecommunications network.

2. The system for interworking digital simultaneous voice and data (DSVD) modems with a radio telecommunications network of claim 1 wherein said radio telecommunications network is a time division multiple access (TDMA) radio telecommunications network.

3. A system for interworking digital simultaneous voice and data (DSVD) modems with a radio telecommunications network having a mobile switching center (MSC) which communicates with a mobile station utilizing a circuit mode Radio Link Protocol (RLP), said system comprising:
    a digital coder/decoder (codec) associated with said mobile station for coding a voice signal according to voice coding standards for DSVD modems;
    means within said mobile station for passing a data signal between said MSC and an applications terminal connected to said mobile station;
    an interworking function associated with said MSC for multiplexing said coded voice signal and said data signal into signals in a landline telecommunications protocol; and
    means for modulating and transmitting said multiplexed signals in a landline telecommunications protocol to a landline telecommunications network.

4. The system for interworking digital simultaneous voice and data (DSVD) modems with a radio telecommunications network of claim 3 wherein said means within said mobile station for passing a data signal between said MSC and an applications terminal connected to said mobile station includes a data compressor and framer.

5. The system for interworking digital simultaneous voice and data (DSVD) modems with a radio telecommunications network of claim 4 further comprising, within said mobile station:
    a voice digitizer and sampler which digitizes the voice signal prior to sending the voice signal to the digital codec;
    a DSVD multiplexer which multiplexes the output of the digital codec and the output of the data compressor and framer;
    means for formatting the output of the DSVD multiplexer in the circuit mode RLP;
    a slot formatter which formats the circuit mode RLP into Time Division Multiple Access (TDMA) timeslots; and
    a radio transmitter which transmits the multiplexed and formatted voice and data signals from the mobile station to the MSC.

6. A method of simultaneously conducting a data transfer to a first destination telephone number and a voice call to a second destination telephone number, said transfer and call being made between a mobile station and a radio telecommunications network having a mobile switching center (MSC) which serves the mobile station, said method comprising the steps of:
    connecting said mobile station to a data terminal through a modem;
    notifying said MSC from said mobile station that a simultaneous voice and data call is desired;
    assigning within said MSC, a first timeslot for a voice call and at least one additional timeslot for a data transfer;
    providing said MSC with the first destination telephone number for the voice call;
    providing said MSC with the second destination telephone number for the data transfer;
    establishing the voice call between the mobile station and the first destination telephone number; and
    establishing the data transfer between the mobile station and the second destination telephone number while continuing the voice call.

7. The method of simultaneously conducting a data transfer and a voice call between a mobile station and a radio telecommunications network of claim 6 wherein said step of notifying said MSC from said mobile station that a simultaneous voice and data call is desired includes transmitting a simultaneous voice/data parameter in an origination message from the mobile station to the MSC.

8. A method of simultaneously conducting a data transfer and a voice call between a mobile station having a first and second cellular transmitter/receiver pairs, and a radio telecommunications network having a mobile switching center (MSC) which serves the mobile station, said method comprising the steps of:
    notifying said MSC that a simultaneous voice and data call with said mobile station is desired;
    allocating a first voice channel to the first cellular transmitter/receiver pair in the mobile station;
    allocating a second voice channel to the second cellular transmitter/receiver pair in the mobile station;
    establishing the voice call on the first voice channel; and
    establishing the data transfer on the second voice channel.

9. The method of simultaneously conducting a data transfer and a voice call of claim 8 further comprising sending information identifying the second voice channel to the mobile station over a control channel.

10. The method of simultaneously conducting a data transfer and a voice call of claim 8 further comprising, before the step of allocating a second voice channel to the second transmitter/receiver pair in the mobile station, the step of performing an authentication to prevent fraud.

11. The method of simultaneously conducting a data transfer and a voice call of claim 8 further comprising the step of handing off both the first and second voice channels together when the mobile station moves from one cell to another cell.

12. The method of simultaneously conducting a data transfer and a voice call of claim 8 further comprising individually releasing only the first voice channel when the voice call is completed and the data transfer is continuing.

13. The method of simultaneously conducting a data transfer and a voice call of claim 12 further comprising individually releasing only the second voice channel when the data transfer is completed and the voice call is continuing.

14. The method of simultaneously conducting a data transfer and a voice call of claim 12 further comprising marking the mobile station as idle when both the voice call and the data transfer are completed.

15. A method of simultaneously conducting a data transfer and a voice call between a mobile station having a first cellular transmitter/receiver pair, and a radio telecommunications network having a mobile switching center (MSC) which serves the mobile station, said method comprising the steps of:

connecting the mobile station to a data terminal through a modem having a second cellular transmitter/receiver pair;

notifying said MSC that a simultaneous voice and data call with said mobile station is desired;

allocating a first voice channel to the first cellular transmitter/receiver pair in the mobile station;

allocating a second voice channel to the second cellular transmitter/receiver pair in the modem;

establishing the voice call on the first voice channel; and establishing the data transfer on the second voice channel.

16. The method of simultaneously conducting a data transfer and a voice call of claim 15 further comprising sending information identifying the second voice channel to the mobile station over a control channel.

17. The method of simultaneously conducting a data transfer and a voice call of claim 15 further comprising, before the step of allocating a second voice channel to the second transmitter/receiver pair in the modem, the step of performing an authentication to prevent fraud.

18. The method of simultaneously conducting a data transfer and a voice call of claim 15 further comprising the step of handing off both the first and second voice channels together when the mobile station moves from one cell to another cell.

19. The method of simultaneously conducting a data transfer and a voice call of claim 15 further comprising individually releasing only the first voice channel when the voice call is completed and the data transfer is continuing.

20. The method of simultaneously conducting a data transfer and a voice call of claim 19 further comprising individually releasing only the second voice channel when the data transfer is completed and the voice call is continuing.

21. The method of simultaneously conducting a data transfer and a voice call of claim 20 further comprising marking the mobile station as idle when both the voice call and the data transfer are completed.

22. A method of initiating a data transfer from a mobile station simultaneously with an ongoing voice call from the mobile station to a Time Division Multiple Access (TDMA) radio telecommunications network having a mobile switching center (MSC) which serves the mobile station and an Interworking Function (IWF) associated with the MSC, said method comprising the steps of:

establishing the voice call between the mobile station and a called party telephone number utilizing a first timeslot;

initiating by the mobile station, the data transfer;

notifying said MSC from said mobile station that a digital simultaneous voice and data (DSVD) data transfer is desired;

seizing by said MSC, the IWF;

seizing by said MSC, at least one additional timeslot for the data transfer;

notifying said mobile station from said MSC that the DSVD data transfer is granted; and transferring the data from the mobile station to the network utilizing the additional timeslot.

23. The method of initiating a data transfer from a mobile station simultaneously with an ongoing voice call from the mobile station to a TDMA radio telecommunications network of claim 22 further comprising, after the step of notifying said MSC from said mobile station that a DSVD data transfer is desired, the step of verifying by the MSC that the mobile station is authorized for DSVD service.

24. The method of initiating a data transfer from a mobile station simultaneously with an ongoing voice call from the mobile station to a TDMA radio telecommunications network of claim 22 wherein said step of seizing by said MSC, at least one additional timeslot for the data transfer includes seizing at least one additional adjacent timeslot on the same radio channel as the voice call.

25. The method of initiating a data transfer from a mobile station simultaneously with an ongoing voice call from the mobile station to a TDMA radio telecommunications network of claim 22 wherein the mobile station communicates over a radio link to the MSC utilizing a radio link protocol (RLP), and the method further comprises, after the step of notifying said mobile station from said MSC that the DSVD data transfer is granted, the steps of:

adding the additional timeslots to the mobile stations radio link with the MSC; and setting up the RLP to communicate with the seized IWF.

26. The method of initiating a data transfer from a mobile station simultaneously with an ongoing voice call from the mobile station to a TDMA radio telecommunications network of claim 22 wherein the step of notifying said MSC from said mobile station that a DSVD data transfer is desired includes sending from the mobile station to the MSC, a Service Request message which includes a DSVD service code.

* * * * *

UNITED STATES PATENT AND TRADEMARK OFFICE
CERTIFICATE OF CORRECTION

PATENT NO. : 6,112,084
DATED : August 29, 2000
INVENTOR(S) : Alan Sicher and Nikos Katinakis It is certified that error appears in the above-identified patent and that said Letters Patent are hereby corrected as shown below:

Column 5, Line 64, delete "foamed" and substitute --framed-- therefor.

Column 6, line 25, delete "Ms" and substitute --MS-- therefor.

Signed and Sealed this

Fifteenth Day of May, 2001

Attest:

NICHOLAS P. GODICI

Attesting Officer

Acting Director of the United States Patent and Trademark Office